US009294458B2

(12) United States Patent
Singh et al.

(10) Patent No.: US 9,294,458 B2
(45) Date of Patent: Mar. 22, 2016

(54) MANAGING IDENTITY PROVIDER (IDP) IDENTIFIERS FOR WEB REAL-TIME COMMUNICATIONS (WEBRTC) INTERACTIVE FLOWS, AND RELATED METHODS, SYSTEMS, AND COMPUTER-READABLE MEDIA

(71) Applicant: Avaya Inc., Basking Ridge, NJ (US)

(72) Inventors: Kundan Singh, San Francisco, CA (US); John H. Yoakum, Cary, NC (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 14/050,891

(22) Filed: Oct. 10, 2013

(65) Prior Publication Data

US 2014/0282903 A1 Sep. 18, 2014

Related U.S. Application Data

(60) Provisional application No. 61/781,122, filed on Mar. 14, 2013.

(51) Int. Cl.
*G06F 21/30* (2013.01)
*H04L 29/06* (2006.01)
*H04L 29/12* (2006.01)

(52) U.S. Cl.
CPC ............ *H04L 63/08* (2013.01); *H04L 65/1069* (2013.01); *H04L 65/4046* (2013.01); *H04L 65/607* (2013.01); *H04L 61/2575* (2013.01); *H04L 61/2589* (2013.01)

(58) Field of Classification Search
CPC ... H04L 63/08; H04L 63/0815; H04L 63/105; H04L 67/02; H04L 2463/082; H04L 63/0823; H04L 63/083; H04L 63/102; H04L 63/126; H04L 63/168; H04L 63/0807; H04L 63/101; H04L 63/104; H04L 29/12122; H04L 61/1547; H04L 12/585; H04L 51/12; H04L 63/02; G06F 21/31; G06F 21/41; G06F 17/30876; G06F 21/32; G06F 21/33; G06F 21/40; G06F 21/45; G06F 7/04
USPC ............................. 726/4, 5; 709/225; 379/68
See application file for complete search history.

(56) References Cited

U.S. PATENT DOCUMENTS 6,714,967 B1 3/2004 Horvitz
7,107,316 B2 9/2006 Brown et al.
(Continued)

FOREIGN PATENT DOCUMENTS

EP 1615386 A1 1/2006
EP 2529316 A2 12/2012
(Continued)

OTHER PUBLICATIONS

Andreasen et al., "Session Description Protocol (SDP): Security Descriptions for Media Streams," Network Working Group, Request for Comments: 4568, Standards Track, The Internet Society, Jul. 2006, 40 pages.
(Continued)

*Primary Examiner* — Thanhnga B Truong
(74) *Attorney, Agent, or Firm* — Withrow & Terranova, PLLC

(57) ABSTRACT

Embodiments include managing Identity Provider (IdP) identifiers for Web Real-Time Communications (WebRTC) interactive flows, and related methods, systems, and computer-readable media. In one embodiment, a method for managing IdPs comprises selecting, by a WebRTC client executing on a computing device, one or more preferred IdP identifiers indicated by one or more preferences from a plurality of IdP identifiers corresponding to a plurality of IdPs for providing identity assertions during an establishment of a WebRTC interactive flow. The method further comprises obtaining one or more identity assertions from respective ones of the plurality of IdPs corresponding to the one or more preferred IdP identifiers. The method also comprises providing, during the establishment of the WebRTC interactive flow, the one or more identity assertions. In this manner, an entity may specify the IdP used for identity authentication, and the number of identity assertions provided during initiation of the WebRTC interactive flow.

17 Claims, 8 Drawing Sheets

(56) References Cited

U.S. PATENT DOCUMENTS

| | | | |
|---|---|---|---|
| 7,145,898 B1 | 12/2006 | Elliott | |
| 7,266,591 B1 | 9/2007 | Johnston | |
| 7,379,993 B2 | 5/2008 | Valdes et al. | |
| 7,636,348 B2 | 12/2009 | Bettis et al. | |
| 7,730,309 B2 | 6/2010 | Zimmermann | |
| 8,015,484 B2 | 9/2011 | Backer | |
| 8,250,635 B2* | 8/2012 | Chari et al. | 726/5 |
| 8,300,632 B2 | 10/2012 | Davis et al. | |
| 8,467,308 B2 | 6/2013 | Johnston | |
| 8,494,507 B1 | 7/2013 | Tedesco et al. | |
| 8,601,144 B1 | 12/2013 | Ryner | |
| 8,605,711 B1 | 12/2013 | Sinnreich et al. | |
| 8,606,950 B2 | 12/2013 | Glatron et al. | |
| 8,693,392 B2 | 4/2014 | Cooper et al. | |
| 8,695,077 B1 | 4/2014 | Gerhard et al. | |
| 8,737,596 B2 | 5/2014 | Kelley et al. | |
| 8,744,147 B2 | 6/2014 | Torti | |
| 8,832,271 B2* | 9/2014 | McCarty | 709/225 |
| 8,856,236 B2 | 10/2014 | Moore et al. | |
| 8,861,692 B1 | 10/2014 | Phelps et al. | |
| 8,867,731 B2 | 10/2014 | Lum et al. | |
| 2002/0161685 A1 | 10/2002 | Dwinnell | |
| 2003/0112766 A1 | 6/2003 | Riedel et al. | |
| 2003/0131245 A1 | 7/2003 | Linderman | |
| 2003/0188193 A1 | 10/2003 | Venkataramappa | |
| 2004/0216173 A1 | 10/2004 | Horoszowski et al. | |
| 2005/0084082 A1 | 4/2005 | Horvitz et al. | |
| 2005/0177380 A1 | 8/2005 | Pritchard et al. | |
| 2006/0104526 A1 | 5/2006 | Gringeler et al. | |
| 2006/0155814 A1 | 7/2006 | Bennett et al. | |
| 2006/0159063 A1 | 7/2006 | Kumar | |
| 2006/0200855 A1 | 9/2006 | Willis | |
| 2007/0083929 A1 | 4/2007 | Sprosts et al. | |
| 2007/0143408 A1 | 6/2007 | Daigle | |
| 2007/0255662 A1 | 11/2007 | Tumminaro | |
| 2007/0283423 A1 | 12/2007 | Bradley et al. | |
| 2008/0162642 A1 | 7/2008 | Bachiri et al. | |
| 2008/0192646 A1 | 8/2008 | Song et al. | |
| 2008/0270541 A1 | 10/2008 | Keener et al. | |
| 2009/0070477 A1 | 3/2009 | Baum et al. | |
| 2009/0094684 A1 | 4/2009 | Chinnusamy et al. | |
| 2010/0246571 A1 | 9/2010 | Geppert et al. | |
| 2011/0102930 A1 | 5/2011 | Johnston et al. | |
| 2011/0206013 A1 | 8/2011 | Aramoto et al. | |
| 2011/0238862 A1 | 9/2011 | Chaturvedi et al. | |
| 2012/0001932 A1 | 1/2012 | Burnett et al. | |
| 2012/0079031 A1 | 3/2012 | Matthews et al. | |
| 2012/0137231 A1 | 5/2012 | Maxfield et al. | |
| 2012/0158862 A1* | 6/2012 | Mosko et al. | 709/206 |
| 2012/0192086 A1 | 7/2012 | Ghods et al. | |
| 2013/0002799 A1 | 1/2013 | Mock | |
| 2013/0078972 A1 | 3/2013 | Levien et al. | |
| 2013/0091286 A1 | 4/2013 | Spencer | |
| 2013/0138829 A1 | 5/2013 | Bulava | |
| 2013/0321340 A1 | 12/2013 | Seo et al. | |
| 2014/0013202 A1 | 1/2014 | Schlumberger | |
| 2014/0043994 A1 | 2/2014 | Bansal et al. | |
| 2014/0095633 A1 | 4/2014 | Yoakum | |
| 2014/0095724 A1 | 4/2014 | Yoakum et al. | |
| 2014/0095731 A1 | 4/2014 | Carey et al. | |
| 2014/0108594 A1 | 4/2014 | Siegel et al. | |
| 2014/0126708 A1 | 5/2014 | Sayko | |
| 2014/0126714 A1 | 5/2014 | Sayko | |
| 2014/0126715 A1 | 5/2014 | Lum et al. | |
| 2014/0143823 A1 | 5/2014 | Manchester et al. | |
| 2014/0161237 A1* | 6/2014 | Tolksdorf | 379/68 |
| 2014/0201820 A1 | 7/2014 | Li et al. | |
| 2014/0219167 A1 | 8/2014 | Santhanam et al. | |
| 2014/0222894 A1 | 8/2014 | Gangadharan et al. | |
| 2014/0222930 A1 | 8/2014 | Gangadharan et al. | |
| 2014/0223452 A1 | 8/2014 | Santhanam et al. | |
| 2014/0237057 A1 | 8/2014 | Khodorenko | |
| 2014/0241215 A1 | 8/2014 | Massover et al. | |
| 2014/0245143 A1 | 8/2014 | Saint-Marc | |
| 2014/0258822 A1 | 9/2014 | Li et al. | |
| 2014/0269326 A1 | 9/2014 | Westin et al. | |
| 2014/0270104 A1 | 9/2014 | O'Connor | |
| 2014/0280734 A1 | 9/2014 | Chaturvedi et al. | |
| 2014/0282054 A1 | 9/2014 | Yoakum | |
| 2014/0282135 A1 | 9/2014 | Segre | |
| 2014/0282399 A1 | 9/2014 | Gorelik et al. | |
| 2014/0282765 A1 | 9/2014 | Casey et al. | |
| 2014/0324979 A1 | 10/2014 | Gao et al. | |
| 2014/0325078 A1 | 10/2014 | Shan et al. | |
| 2014/0344169 A1 | 11/2014 | Phelps et al. | |
| 2014/0348044 A1 | 11/2014 | Narayanan et al. | |
| 2014/0365676 A1 | 12/2014 | Yoakum | |
| 2014/0379931 A1 | 12/2014 | Gaviria | |
| 2015/0002614 A1 | 1/2015 | Zino et al. | |
| 2015/0002619 A1 | 1/2015 | Johnston et al. | |
| 2015/0006610 A1 | 1/2015 | Johnston et al. | |
| 2015/0006611 A1 | 1/2015 | Johnston et al. | |
| 2015/0026473 A1 | 1/2015 | Johnston et al. | |
| 2015/0036690 A1 | 2/2015 | Pastro | |
| 2015/0039687 A1 | 2/2015 | Waxman et al. | |
| 2015/0039760 A1 | 2/2015 | Yoakum | |
| 2015/0052067 A1 | 2/2015 | Thiyagarajan et al. | |
| 2015/0180825 A1 | 6/2015 | Ren et al. | |

FOREIGN PATENT DOCUMENTS

| | | | |
|---|---|---|---|
| GB | 2295747 | A | 6/1996 |
| GB | 2468758 | A | 9/2010 |
| GB | 2468759 | A | 9/2010 |
| GB | 2517833 | A | 3/2015 |
| JP | 2002207683 | A | 7/2002 |
| JP | 2002374318 | A | 12/2002 |
| JP | 2005346556 | A | 12/2005 |
| JP | 2006050407 | A | 2/2006 |
| JP | 2011504665 | A | 2/2011 |
| WO | 2014060008 | A1 | 4/2014 |
| WO | 2014123738 | A1 | 8/2014 |
| WO | 2014190094 | A1 | 11/2014 |
| WO | 2015032277 | A1 | 3/2015 |

OTHER PUBLICATIONS

Baugher et al., "The Secure Real-time Transport Protocol (SRTP)," Network Working Group, Request for Comments: 3711, Standards Track, The Internet Society, Mar. 2004, 51 pages.

Johnston et al., "WebRTC: APIs and RTCWEB Protocols of the HTML5 Real-Time Web," (Book), Second Edition, Smashwords Edition, Digital Codex LLC, Jun. 2013, 254 pages.

Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.

McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.

Zimmermann et al., "ZRTP: Media Path Key Agreement for Unicast Secure RTP," Internet Engineering Task Force, Request for Comments: 6189, Informational, IETF Trust, Apr. 2011, 102 pages.

Johnston, Alan et al., "Taking on WebRTC in an Enterprise," IEEE Communications Magazine, Apr. 2013, pp. 48-54, vol. 51, Issue 4.

Search Report for British patent application GB1317121.0 mailed Mar. 14, 2014, 3 pages.

Search Report for British patent application GB1317122.8 mailed Mar. 11, 2014, 3 pages.

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.

Berners-Lee, Tim, "Socially Aware Cloud Storage," Notes on web design, Aug. 17, 2009, http://www.w3.org/DesignIssues/CloudStorage.html, 9 pages.

Chandra, Ramesh et al., "Separating Web Applications from User Data Storage with BStore," presented at the USENIX Conference on

(56) References Cited

OTHER PUBLICATIONS

Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vandat/webfs/webfs.html, 12 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/931,968, mailed Dec. 8, 2014, 6 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 13/955,023, mailed Feb. 2, 2015, 12 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.
Final Office Action for U.S. Appl. No. 13/955,023, mailed Jul. 20, 2015, 17 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Extended European Search Report for European Patent Application 15161452.6, mailed Jun. 23, 2015, 5 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Non-Final Office Action for U.S. Appl. No. 14/037,440, mailed Sep. 12, 2014, 15 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Non-Final Office Action for U.S. Appl. No. 13/863,662, mailed Sep. 25, 2015, 23 pages.
Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Final Office Action for U.S. Appl. No. 13/931,970, mailed Aug. 27, 2015, 10 pages.
Examination Report for British Patent Application GB1411584.4, mailed Aug. 21, 2015, 1 page.
Examination Report for British Patent Application GB1411580.2, mailed Aug. 21, 2015, 1 page.
Notification of Reasons for Refusal for Japanese Patent Application 2013-201221, mailed Aug. 25, 2015, 8 pages.
Non-Final Office Action for U.S. Appl. No. 13/955,711, mailed Nov. 9, 2015, 10 pages.
Non-Final Office Action for U.S. Appl. No. 13/955,023, mailed Dec. 9, 2015, 13 pages.
Non-Final Office Action for U.S. Appl. No. 14/037,440, mailed Oct. 22, 2015, 15 pages.
Advisory Action for U.S. Appl. No. 13/931,967, mailed Nov. 3, 2015, 3 pages.
Advisory Action for U.S. Appl. No. 13/931,970, mailed Nov. 5, 2015, 3 pages.
Non-Final Office Action for U.S. Appl. No. 14/068,943, mailed Dec. 2, 2015, 16 pages.
Non-Final Office Action for U.S. Appl. No. 14/255,429, mailed Nov. 9, 2015, 26 pages.
Author Unknown, "WebRTC," WebRTC.org, Date Accessed: Jan. 26, 2016, 4 pages, http:webrtc.org/.
Notice of Allowance for U.S. Appl. No. No. 13/863,662, mailed Feb. 1, 2016, 17 pages.
Final Office Action for U.S. Appl. No. No. 14/141,798, mailed Dec. 24, 2015, 10 pages.

\* cited by examiner

MANAGING IDENTITY PROVIDER (IDP) IDENTIFIERS FOR WEB REAL-TIME COMMUNICATIONS (WEBRTC) INTERACTIVE FLOWS, AND RELATED METHODS, SYSTEMS, AND COMPUTER-READABLE MEDIA

PRIORITY APPLICATION

The present application claims priority to U.S. Provisional Patent Application Ser. No. 61/781,122 filed Mar. 14, 2013, and entitled "DISTRIBUTED APPLICATION OF ENTERPRISE POLICIES TO WEB REAL-TIME COMMUNICATIONS (WEBRTC) INTERACTIVE SESSIONS, AND RELATED METHODS, SYSTEMS, AND COMPUTER-READABLE MEDIA," which is hereby incorporated herein by reference in its entirety.

BACKGROUND

1. Field of the Disclosure

The technology of the disclosure relates generally to Web Real-Time Communications (WebRTC) interactive sessions.

2. Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hyper Text Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, $2^{nd}$ Edition (2013 Digital Codex LLC), which is incorporated in its entirety herein by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www.ietf.org.

In a typical WebRTC exchange, two WebRTC clients retrieve WebRTC-enabled web applications, such as HTML5/JavaScript web applications, from a web application server. Through the web applications, the two WebRTC clients then engage in an initiation dialogue for initiating a peer connection over which a WebRTC interactive flow (e.g., a real-time video, audio, and/or data exchange) will pass. This initiation dialogue may include a media negotiation used to communicate and reach an agreement on parameters that define characteristics of the WebRTC interactive session.

In some embodiments, the media negotiation may be implemented via a WebRTC offer/answer exchange via a secure network connection such as a Hyper Text Transfer Protocol Secure (HTTPS) connection or a Secure WebSockets connection. In a WebRTC offer/answer exchange, a first WebRTC client sends a WebRTC session description object "offer," which may specify the first WebRTC client's preferred media types and capabilities, to a second WebRTC client. The second WebRTC client then responds with a WebRTC session description object "answer" that indicates which of the offered media types and capabilities are supported and acceptable by the second WebRTC client for the WebRTC interactive session.

Once the initiation dialogue is complete, the WebRTC clients may then establish a direct peer connection with one another, and may begin an exchange of media or data packets transporting real-time communications. The peer connection between the WebRTC clients typically employs the Secure Real-time Transport Protocol (SRTP) to transport real-time media flows, and may utilize various other protocols for real-time data interchange. It is to be understood that the initiation dialogue may employ mechanisms other than a WebRTC offer/answer exchange to establish a WebRTC interactive flow between WebRTC endpoints.

WebRTC also specifies a mechanism for authenticating an identity of a WebRTC client involved in an initiation dialogue (and thus, the peer connection and the WebRTC interactive flow established as a result of the initiation dialogue) through the use of a web-based entity known as an Identity Provider (IdP). This mechanism is described in section 8, "Identity," in the "WebRTC 1.0: Real-time Communication Between Browsers" document available online at, e.g., http://dev.w3.org/2011/webrtc/editor/webrtc.html. To authenticate an identity, the WebRTC client of a participant seeking authentication (the Authenticating Party, or AP) first downloads an authentication application from the IdP. As an example, the authentication application may be a JavaScript web application that implements a generic WebRTC protocol for requesting and verifying identity assertions. The authentication application may also provide specialized logic based on the specific requirements of the IdP. Using the authentication application, the AP obtains an "identity assertion" from the IdP. The process for obtaining an identity assertion may involve, for example, the AP logging into or otherwise providing credentials to the IdP. The WebRTC client of the AP then provides the identity assertion as part of the initiation dialogue. For instance, in the context of a WebRTC offer/answer exchange, the WebRTC client of the AP may attach the identity assertion obtained from the IdP to the offer/answer. The recipient of the offer/answer, known as the Relying Party (RP), then downloads a verification application from the same IdP, and uses it to verify the identity assertion, and, by extension, the identity of the AP.

A WebRTC client may employ a custom IdP for identity assertion, where the custom IdP is programmatically specified by an IdP identifier in a downloaded WebRTC web application through the use of instructions (e.g., the setIdentityProvider instruction). Alternatively, a default IdP identifier may be stored in settings for the WebRTC client for use in the absence of a web-application-specified custom IdP identifier. Thus, in a typical scenario, two IdP identifiers at most are available for a given WebRTC interactive flow, with the WebRTC web application determining whether the custom IdP identifier or the default IdP identifier will be used. However, in some circumstances, this may not provide sufficient control or flexibility over the IdP identifiers to be used for a given WebRTC interactive flow. In the context of WebRTC clients within an enterprise network, an enterprise may wish to specify an enterprise policy for providing more than two IdP identifiers for a WebRTC client, and/or for prioritizing multiple IdP identifiers for use in different communications scenarios. For instance, the enterprise may wish to designate a specific IdP identifier to be employed by all WebRTC clients within an enterprise network regardless of the web-application-specified custom IdP identifiers and/or the default IdP identifiers.

SUMMARY OF THE DETAILED DESCRIPTION

Embodiments disclosed in the detailed description provide managing Identity Provider (IdP) identifiers for Web Real-Time Communications (WebRTC) interactive flows. Related methods, systems, and computer-readable media are also disclosed. In some embodiments, a WebRTC client may incorporate an IdP identifier management agent that may retrieve, prioritize, and/or store multiple IdP identifiers. During an initiation dialogue for a WebRTC interactive flow involving the WebRTC client, the IdP identifier management agent may select one or more preferred IdP identifiers indicated by one or more preferences from a plurality of IdP identifiers to use for identity authentication. The plurality of IdP identifiers may be received by the IdP identifier management agent from an enterprise policy server, may be stored by the WebRTC client as default IdP identifier(s), and/or may be provided by a downloaded WebRTC web application. The one or more preferences may include a preference specified by an enterprise policy, a preference stored by the WebRTC client, and/or a user-provided preference. The IdP identifier management agent may then obtain one or more identity assertions from each IdP corresponding to the one or more preferred IdP identifiers, and may include the one or more identity assertions in the initiation dialogue (e.g., a WebRTC offer/answer exchange) for the WebRTC interactive flow. In this manner, an entity such as an enterprise may exercise fine-grained control over the IdP(s) to be used for identity authentication, and the number and type of identity assertions that may be obtained and provided during the initiation of the WebRTC interactive flow.

In this regard, in one embodiment, a method for managing IdP identifiers for WebRTC interactive flows is provided. The method comprises selecting, by a WebRTC client executing on a computing device, one or more preferred IdP identifiers indicated by one or more preferences from a plurality of IdP identifiers corresponding to a plurality of IdPs for providing identity assertions during an establishment of a WebRTC interactive flow. The method further comprises obtaining one or more identity assertions from respective ones of the plurality of IdPs corresponding to the one or more preferred IdP identifiers. The method also comprises providing, during the establishment of the WebRTC interactive flow, the one or more identity assertions.

In another embodiment, a system for managing IdP identifiers for WebRTC interactive flows is provided. The system comprises at least one communications interface, and a computing device associated with the at least one communications interface and comprising an IdP identifier management agent. The IdP identifier management agent is configured to select one or more preferred IdP identifiers indicated by one or more preferences from a plurality of IdP identifiers corresponding to a plurality of IdPs for providing identity assertions during an establishment of a WebRTC interactive flow. The IdP identifier management agent is further configured to obtain one or more identity assertions from respective ones of the plurality of IdPs corresponding to the one or more preferred IdP identifiers via the at least one communications interface. The IdP identifier management agent is also configured to provide, during the establishment of the WebRTC interactive flow, the one or more identity assertions.

In another embodiment, a non-transitory computer-readable medium is provided. The non-transitory computer-readable medium has stored thereon computer-executable instructions to cause a processor to implement a method comprising selecting, by a WebRTC client, one or more preferred IdP identifiers indicated by one or more preferences from a plurality of IdP identifiers corresponding to a plurality of IdPs for providing identity assertions during an establishment of a WebRTC interactive flow. The method implemented by the computer-executable instructions further comprises obtaining one or more identity assertions from respective ones of the plurality of IdPs corresponding to the one or more preferred IdP identifiers. The method implemented by the computer-executable instructions also comprises providing, during the establishment of the WebRTC interactive flow, the one or more identity assertions.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
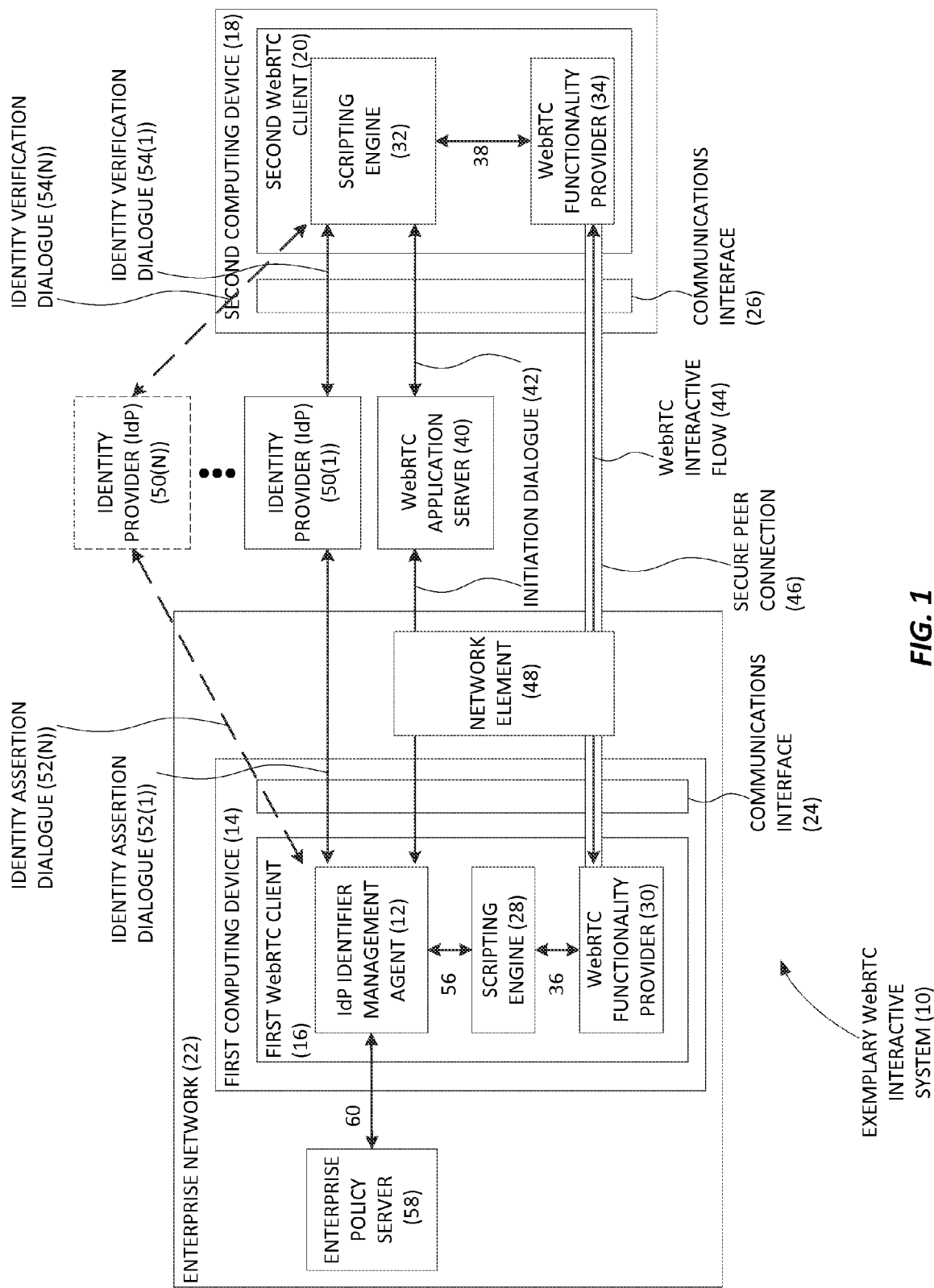
FIG. 1 is a conceptual diagram illustrating an exemplary topology of a Web Real Time Communications (WebRTC) interactive flow including a WebRTC client comprising an Identity Provider (IdP) identifier management agent.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide managing Identity Provider (IdP) identifiers for Web Real-Time Communications (WebRTC) interactive flows. Related methods, systems, and computer-readable media are also disclosed. In some embodiments, a WebRTC client may incorporate an IdP identifier management agent that may retrieve, prioritize, and/or store multiple IdP identifiers. During an initiation dialogue for a WebRTC interactive flow involving the WebRTC client, the IdP identifier management agent may select one or more preferred IdP identifiers indicated by one or more preferences from a plurality of IdP identifiers to use for identity authentication. The plurality of IdP identifiers may be received by the IdP identifier management agent from an enterprise policy server, may be stored by the WebRTC client as default IdP identifier(s), and/or may be provided by a downloaded WebRTC web application. The one or more preferences may include a preference specified by an enterprise policy, a preference stored by the WebRTC client, and/or a user-provided preference. The IdP identifier management agent may then obtain one or more identity assertions from each IdP corresponding to the one or more preferred IdP identifiers, and may include the one or more identity assertions in the initiation dialogue (e.g., a WebRTC offer/answer exchange) for the WebRTC interactive flow. In this manner, an entity such as an enterprise may exercise fine-grained control over the IdP(s) to be used for identity authentication, and the number and type of identity assertions that may be obtained and provided during the initiation of the WebRTC interactive flow.

In this regard, in one embodiment, a method for managing IdP identifiers for WebRTC interactive flows is provided. The method comprises selecting, by a WebRTC client executing on a computing device, one or more preferred IdP identifiers indicated by one or more preferences from a plurality of IdP identifiers corresponding to a plurality of IdPs for providing identity assertions during an establishment of a WebRTC interactive flow. The method further comprises obtaining one or more identity assertions from respective ones of the plurality of IdPs corresponding to the one or more preferred IdP identifiers. The method also comprises providing, during the establishment of the WebRTC interactive flow, the one or more identity assertions.

FIG. 1 illustrates an exemplary WebRTC interactive system 10 for managing IdP identifiers for WebRTC interactive flows as disclosed herein. In particular, the exemplary WebRTC interactive system 10 includes an IdP identifier management agent 12 that provides functionality for obtaining, prioritizing, and/or storing one or more IdP identifiers, and for obtaining one or more identity assertions based on a preferred one(s) of the one or more IdP identifiers. As used herein, a "WebRTC interactive session" refers to operations for carrying out a WebRTC initiation dialogue, establishing a peer connection, and commencing a WebRTC interactive flow between two or more endpoints. A "WebRTC interactive flow," as disclosed herein, refers to an interactive media flow and/or an interactive data flow that passes between or among two or more endpoints according to the WebRTC standards and protocols. As non-limiting examples, an interactive media flow constituting a WebRTC interactive flow may comprise a real-time audio stream and/or a real-time video stream, or other real-time media or data streams. Data and/or media comprising a WebRTC interactive flow may be collectively referred to herein as "content."

Before discussing details of the IdP identifier management agent 12, the establishment of a WebRTC interactive flow in the WebRTC interactive system 10 of FIG. 1 is first described. In FIG. 1, a first computing device 14 executes a first WebRTC client 16, and a second computing device 18 executes a second WebRTC client 20. In the example of FIG. 1, the first computing device 14 is part of an enterprise network 22. However, it is to be understood that in some embodiments the computing devices 14 and 18 may both be located within a same public or private network, or may be located within separate, communicatively coupled public or private networks. Some embodiments of the exemplary WebRTC interactive system 10 of FIG. 1 may provide that each of the computing devices 14 and 18 may be any computing device having network communications capabilities, such as a smartphone, a tablet computer, a dedicated web appliance, a media server, a desktop or server computer, or a purpose-built communications device, as non-limiting examples. The computing devices 14 and 18 include communications interfaces 24 and 26 respectively, for physically connecting the computing devices 14 and 18 to one or more public and/or private networks. In some embodiments, the elements of the computing devices 14 and 18 may be distributed across more than one computing device 14, 18.

The WebRTC clients 16 and 20, in this example, may each be a web browser application, a dedicated communications application, or an interface-less application such as a daemon or service application, as non-limiting examples. The first WebRTC client 16 comprises a scripting engine 28 and a WebRTC functionality provider 30. Similarly, the second WebRTC client 20 comprises a scripting engine 32 and a WebRTC functionality provider 34. The scripting engines 28 and 32 enable client-side applications written in a scripting language, such as JavaScript, to be executed within the WebRTC clients 16 and 20, respectively. The scripting engines 28 and 32 also provide application programming interfaces (APIs) to facilitate communications with other functionality providers within the WebRTC clients 16 and/or 20, with the computing devices 14 and/or 18, and/or with other web clients, user devices, or web servers. The WebRTC functionality provider 30 of the first WebRTC client 16 and the WebRTC functionality provider 34 of the second WebRTC client 20 implement the protocols, codecs, and APIs necessary to enable real-time interactive flows via WebRTC. The scripting engine 28 and the WebRTC functionality provider 30 are communicatively coupled via a set of defined APIs, as indicated by bidirectional arrow 36. Likewise, the scripting engine 32 and the WebRTC functionality provider 34 are communicatively coupled as shown by bidirectional arrow 38.

A WebRTC application server 40 is provided for serving a WebRTC-enabled web application (not shown) to requesting WebRTC clients 16, 20, and for relaying an initiation dialogue 42 during establishment of a WebRTC interactive flow 44. In some embodiments, the WebRTC application server 40 may be a single server, while in some applications the WebRTC application server 40 may comprise multiple servers that are communicatively coupled to each other. It is to be understood that the WebRTC application server 40 may reside within the same public or private network as the computing devices 14 and/or 18, or may be located within a separate, communicatively coupled public or private network.

FIG. 1 further illustrates a characteristic WebRTC topology that results from establishing the WebRTC interactive flow 44 between the first WebRTC client 16 and the second WebRTC client 20. To establish the WebRTC interactive flow 44, the first WebRTC client 16 and the second WebRTC client 20 both download a WebRTC web application (not shown) from the WebRTC application server 40. In some embodiments, the WebRTC web application comprises an HTML5/JavaScript web application that provides a rich user interface using HTML5, and uses JavaScript to handle user input and to communicate with the WebRTC application server 40.

The first WebRTC client 16 and the second WebRTC client 20 then engage in the initiation dialogue 42 via the WebRTC application server 40. Typically, the initiation dialogue 42 takes place over secure web connections, such as Hyper Text Transfer Protocol Secure (HTTPS) connections. The initiation dialogue 42 may include WebRTC session description objects, Hyper Text Transfer Protocol (HTTP) header data, certificates, cryptographic keys, and/or network routing data, as non-limiting examples. In some embodiments, the initiation dialogue 42 may comprise a WebRTC offer/answer exchange. Data exchanged during the initiation dialogue 42 may be used to determine the media types and capabilities for the desired WebRTC interactive flow 44. Once the initiation dialogue 42 is complete, the WebRTC interactive flow 44 may be established via a secure peer connection 46 between the first WebRTC client 16 and the second WebRTC client 20.

It is to be understood that some embodiments may utilize topographies other than the topography illustrated in FIG. 1. For example, some embodiments may employ a topography in which two web application servers communicate directly with each other via protocols such as Session Initiation Protocol (SIP) or Jingle, as non-limiting examples. It is to be further understood that, instead of the second WebRTC client 20, the second computing device 18 may comprise a SIP client device, a Jingle client device, or a Public Switched Telephone Network (PSTN) gateway device that is communicatively coupled to a telephone.

In some embodiments, the initiation dialogue 42 and/or the secure peer connection 46 may pass through a network element 48. The network element 48 may be a computing device having network communications capabilities, and may comprise a network router, a network switch, a network bridge, a Traversal Using Relays around NAT (TURN) server, and/or a Session Traversal Utilities for Network Address Translation (STUN) server. Some embodiments may provide that the network element 48 requires an authentication (not shown) from the first computing device 14 and/or from the first WebRTC client 16. In the example of FIG. 1, the network element 48 is located within the enterprise network 22. It is to be understood that, in some embodiments, the network element 48 may reside within the same public or private network as the computing devices 14 and/or 18, or may be located within a separate, communicatively coupled public or private network.

During establishment of the WebRTC interactive flow 44, the WebRTC web application may require authentication of an identity of the first WebRTC client 16 to authenticate the secure peer connection 46 and the WebRTC interactive flow 44. This may be accomplished through the use of IdPs such as IdPs 50(1-N). As seen in FIG. 1, the IdPs 50(1-N) are located external to the enterprise network 22. However, it is to be understood that, in some embodiments, one or more of the IdPs 50(1-N) may reside within the enterprise network 22, within the same public or private network as the computing devices 14 and/or 18, or within a separate, communicatively coupled public or private network.

In a typical authentication exchange, the first WebRTC client 16 engages in an identity assertion dialogue (e.g., an identity assertion dialogue 52(1)) with an IdP such as IdP 50(1). As part of the identity assertion dialogue 52(1), the first WebRTC client 16 may download an authentication application (not shown) from the IdP 50(1), and may request an identity assertion (not shown) from the IdP 50(1). After obtaining an identity assertion, the first WebRTC client 16 provides the identity assertion to the second WebRTC client 20 as part of the initiation dialogue 42 (e.g., as part of a WebRTC offer/answer exchange). The second WebRTC client 20 may then verify the identity assertion by engaging in an identity verification dialogue (e.g., identity verification dialogue 54(1)) with the IdP 50(1). If the identity assertion is successfully verified, the second WebRTC client 20 may continue with the initiation dialogue 42 and establish the secure peer connection 46 and the WebRTC interactive flow 44. If the identity assertion provided by the first WebRTC client 16 is not successfully verified, the second WebRTC client 20 may opt to reject the initiation dialogue 42.

In a typical WebRTC identity authentication scenario, at most two IdP identifiers are available to authenticate a given WebRTC client: a custom IdP identifier that may be provided by the downloaded WebRTC-enabled web application, and/or a default IdP identifier stored by the WebRTC client. However, in some circumstances, this may not provide sufficient control or flexibility over the IdP(s) to be used for a given WebRTC interactive flow. For example, an enterprise may wish to provide multiple IdP identifiers for the first WebRTC client 16 that are prioritized for use in different communications scenarios. The enterprise also may want to designate a specific IdP identifier to be employed by the first WebRTC client 16 within the enterprise network 22 regardless of the web-application-specified custom IdP identifiers and/or the default IdP identifiers for the first WebRTC client 16.

In this regard, the IdP identifier management agent 12 of FIG. 1 is provided. According to embodiments described herein, the IdP identifier management agent 12 enables an entity such as an enterprise to specify one or more preferred IdP identifiers, indicated by one or more preferences, for use in identity authentication during establishment of the WebRTC interactive flow 44, and may also facilitate the use of multiple IdP identifiers for identity authentication. In some embodiments, the IdP identifier management agent 12 may be implemented as an extension or plug-in for the first WebRTC client 16, and may be communicatively coupled to the scripting engine 28 of the first WebRTC client 16, as indicated by bidirectional arrow 56. It is to be understood that some embodiments may provide that the IdP identifier management agent 12 may be integrated into the WebRTC functionality provider 30 and/or the scripting engine 28, or otherwise implemented as an integral part of the first WebRTC client 16.

Some embodiments may provide that the IdP identifier management agent 12 is communicatively coupled to an enterprise policy server 58, as indicated by bidirectional arrow 60. Accordingly, the one or more preferred IdP identifiers may be selected by the IdP identifier management agent 12 from one or more IdP identifiers that are designated by an enterprise policy specified by the enterprise policy server 58. In this manner, an enterprise may exercise control over what IdP the first WebRTC client 16 uses to authenticate a WebRTC interactive session that passes over the enterprise network 22. In some embodiments, the one or more preferred IdP identifiers may be selected from one or more IdP identifiers that are stored as default IdP identifiers by the first WebRTC client 16, and/or that are specified by the downloaded WebRTC web application.

Selection of the one or more preferred IdP identifiers may be made by the IdP identifier management agent 12 based on one or more preferences (not shown). The one or more preferences may be provided by an enterprise policy specified by the enterprise policy server 58, and/or may be provided by a user input. In some embodiments, the one or more preferences may include a preference flag indicating a preferred IdP identifier, or may include a preference ranking indicating a relative preference of an IdP identifier compared to one or more other IdP identifiers, as non-limiting examples.

After selecting the one or more preferred IdP identifiers, the IdP identifier management agent 12 may obtain one or more identity assertions from the IdPs 50(1-N) corresponding to the one or more preferred IdP identifiers during the initiation dialogue 42. For example, in some embodiments, the IdP identifier management agent 12 may intercept WebRTC API calls in the downloaded WebRTC web application as it is executed by the scripting engine 28 of the first WebRTC client 16. In this manner, the IdP identifier management agent 12 may dynamically modify a request for identity assertion by the WebRTC web application in order to ensure that one or more identity assertions are obtained from the one or more preferred IdP identifiers. As non-limiting examples, the IdP identifier management agent 12 may intercept instructions such as the setIdentityProvider instruction provided by the WebRTC web application, and may modify the instructions to specify one or more preferred IdP identifiers before the instructions are executed by the scripting engine 28. In some embodiments, modifying the instructions may include removing an IdP identifier specified in an original instruction, and replacing the removed IdP identifier with the one or more preferred IdP identifiers.

Some embodiments may provide that the IdP identifier management agent 12 may inject new instructions (e.g., the setIdentityProvider instruction) into the WebRTC web application. This may ensure the use of one or more preferred IdP identifiers even when the WebRTC web application itself does not specify an IdP identifier. In some embodiments, existing instructions provided by the WebRTC web application may be removed entirely by the IdP identifier management agent 12 without being replaced by a new instruction. As a non-limiting example, this may permit a user to remain anonymous in a scenario where the WebRTC web application attempts to force an identity assertion and/or verification using an application-specified IdP.

Likewise, the IdP identifier management agent 12 may intercept and modify WebRTC API calls to provide the obtained one or more identity assertions as part of the initiation dialogue 42. For instance, the IdP identifier management agent 12 may intercept instructions such as createOffer and/or createAnswer instructions provided by the WebRTC web application. The instructions may be modified by the IdP identifier management agent 12 to incorporate the obtained one or more identity assertions into a WebRTC offer/answer exchange.

In some embodiments, the IdP identifier management agent 12 may further modify the initiation dialogue 42 (e.g., a WebRTC offer/answer) to include one or more authentications for the network element 48. This may enable the first WebRTC client 16 to automatically provide credentials for accessing the functionality of the network element 48. As non-limiting examples, the IdP identifier management agent 12 may include a STUN server authentication and/or a TURN server authentication for the first WebRTC client 16 in the initiation dialogue 42. The one or more authentications for the network element 48 may include an IdP identifier for use by the network element 48 for authentication purposes. Some embodiments may provide that the IdP identifier to be used by the network element 48 for authentication purposes may be a different IdP identifier than the one or more preferred IdP identifiers used by the first WebRTC client 16 for identity assertion and/or verification.

Figure 2:
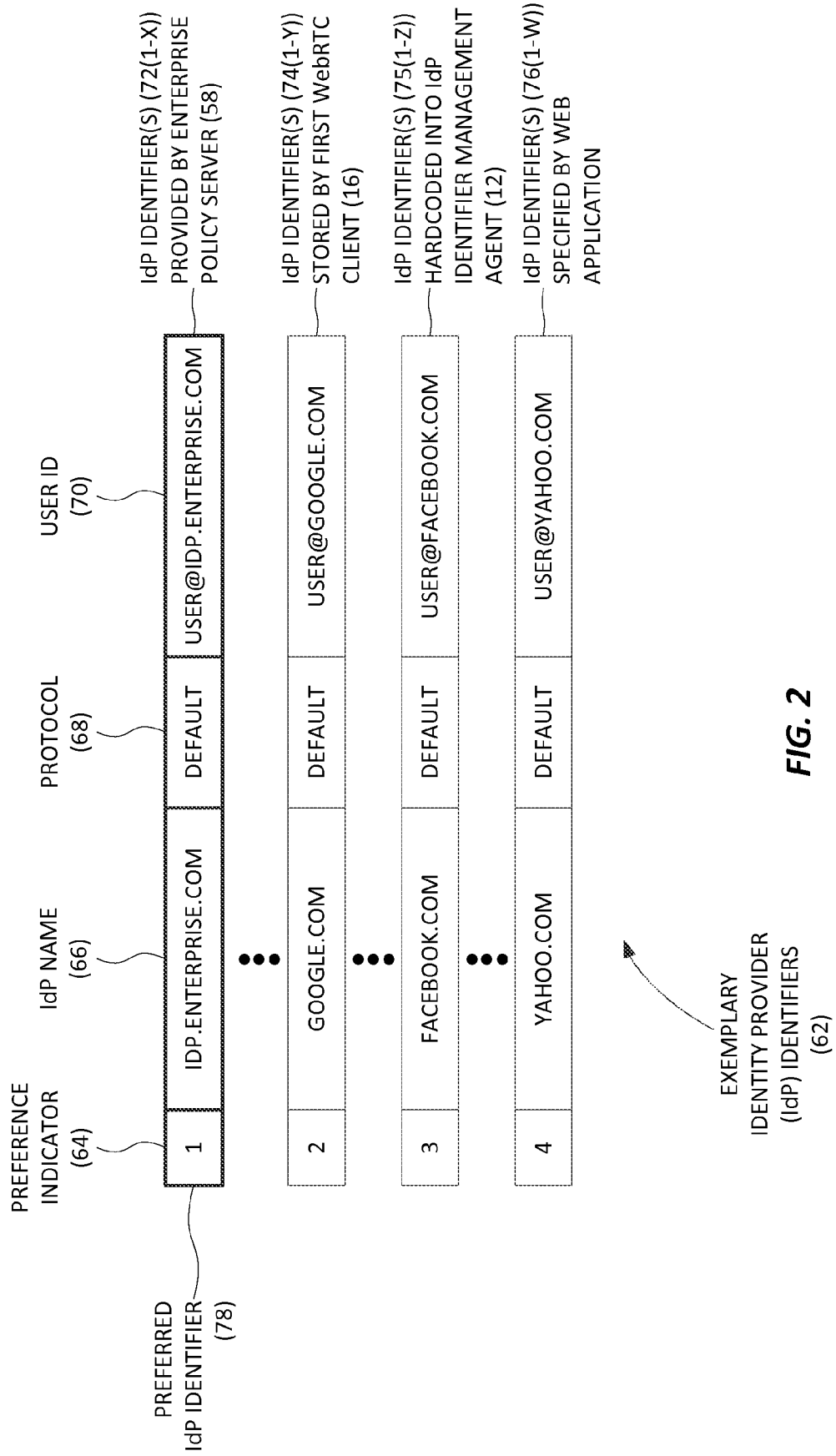
FIG. 2 is a diagram illustrating exemplary IdP identifiers, including IdP identifiers that are provided by an enterprise policy server, that are stored as defaults by a WebRTC client, and that are specified by a WebRTC web application.

FIG. 2 illustrates exemplary IdP identifiers 62 that may be utilized by the IdP identifier management agent 12 of FIG. 1 to obtain one or more identity assertions. In the example of FIG. 2, the exemplary IdP identifiers 62 are represented by a table, which in some embodiments may be implemented as a database table or other appropriate data structure. Each of the exemplary IdP identifiers 62 may comprise a preference indicator 64, a IdP name 66, a protocol 68, and a user identification (ID) 70, as non-limiting examples. The preference indicator 64 may indicate which of the exemplary IdP identifiers 62 is preferred for identity authentication in a WebRTC interactive session. In some embodiments, the preference indicator 64 may comprise a preference ranking and/or a preference flag, and may be specified by an enterprise policy server (such as the enterprise policy server 58 of FIG. 1) or by a user input. In the example of FIG. 2, the preference indicator 64 is a ranking assigned to each of IdP identifiers 72(1-X), 74(1-Y), 75(1-Z), and 76(1-W), with the highest ranking IdP identifier (i.e., preferred IdP identifier 78) being selected for use in a WebRTC interactive session. It is to be understood that, in some embodiments, the preferred IdP identifier 78 may comprise multiple ones of the exemplary IdP identifiers 62.

The IdP name 66, in some embodiments, may comprise a Domain Name System (DNS) name or other identification information for use by the first WebRTC client 16 of FIG. 1 to access a corresponding IdP. The protocol 68 may specify the network protocol to be used by the first WebRTC client 16 in contacting the IdP, and the user ID 70 may represent a user identification previously established with the IdP. It is to be understood that, in some embodiments, the protocol 68 and/or the user ID 70 may be optional.

As seen in FIG. 2, the exemplary IdP identifiers 62 may be obtained by the IdP identifier management agent 12 of FIG. 1 from different sources. The IdP identifiers 72(1-X) represent IdP identifiers that are provided as part of an enterprise policy specified by the enterprise policy server 58 of FIG. 1. As non-limiting examples, the IdP identifiers 72(1-X) may include one or more IdP identifiers provided or preferred by the enterprise for identity authentication purposes. The IdP identifiers 74(1-Y) may be one or more IdP identifiers that are stored as default IdP identifiers by the first WebRTC client 16. In some embodiments, the IdP identifiers 72(1-X) and/or the IdP identifiers 74(1-Y) may be stored by the first WebRTC client 16 in memory, or in a browser cookie or other file in a persistent data store accessible to the first WebRTC client 16. Some embodiments may provide that the IdP identifiers 72(1-X) and/or the IdP identifiers 74(1-Y) may be updated by, for example, an update to the IdP identifier management agent 12 and/or by an interaction between the first WebRTC client 16 and an external agent.

The IdP identifiers 75(1-Z) may be one or more IdP identifiers that are hardcoded into the IdP identifier management agent 12. The IdP identifiers 76(1-W) indicate IdP identifiers that are included within or specified by a downloaded WebRTC web application, and represent one or more custom IdP identifiers that the WebRTC web application is programmed to use for identity authentication. It is to be understood that the IdP identifiers available for a given WebRTC interactive flow may include IdP identifiers obtained from all of the sources noted above, or IdP identifiers obtained from a subset of the above-listed sources. For example, the first WebRTC client 16 within the enterprise network 22 of FIG. 1 may be bound by an enterprise policy to select an IdP identifier only from the IdP identifiers 72(1-X) for a WebRTC interactive flow passing over the enterprise network 22.

Figure 3:
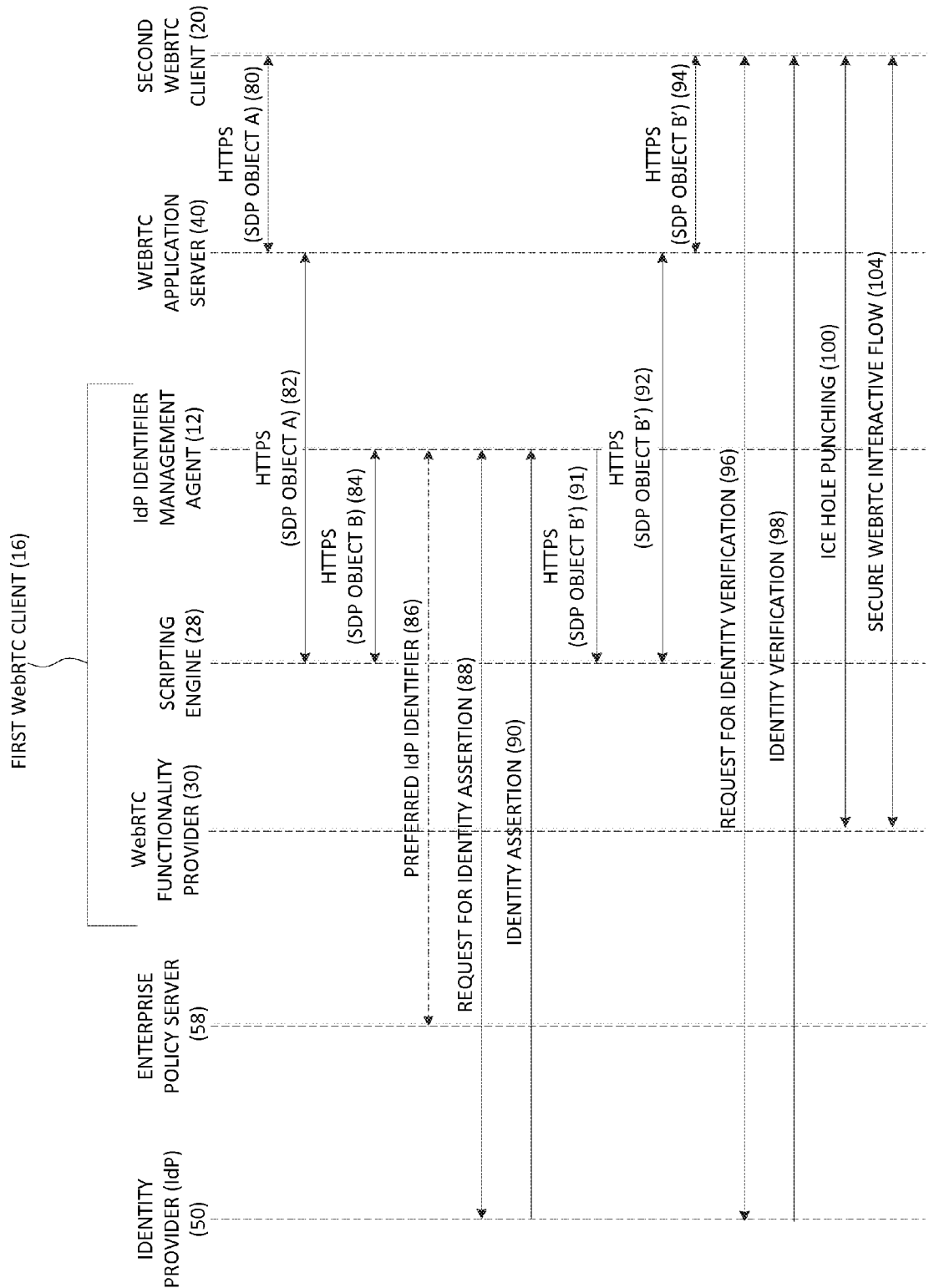
FIG. 3 is a diagram illustrating communications flows during identity assertion and verification exchanges, including a WebRTC client comprising an IdP identifier management agent.

To illustrate exemplary communications flows during identity authentication and verification as facilitated by the IdP identifier management agent 12 of FIG. 1, FIG. 3 is provided. In FIG. 3, the IdP 50, the enterprise policy server 58, the first WebRTC client 16, the WebRTC application server 40, and the second WebRTC client 20 of FIG. 1 are each represented by vertical dotted lines. The WebRTC functionality provider 30, the scripting engine 28, and the IdP identifier management agent 12 of the first WebRTC client 16 are shown as separate elements to better illustrate communications flows therebetween. It is to be understood that the second WebRTC client 20 may comprise the scripting engine 32 and the WebRTC functionality provider 34, which for the sake of clarity are omitted from this example. It is to be further understood that the WebRTC clients 16 and 20 have each downloaded a WebRTC-enabled web application, such as an HTML5/JavaScript WebRTC web application, from the WebRTC application server 40.

As seen in FIG. 3, the establishment of a WebRTC interactive flow begins with a WebRTC offer/answer exchange (e.g., of WebRTC session description objects, as non-limiting examples) that corresponds to the initiation dialogue 42 of FIG. 1. Accordingly, the second WebRTC client 20 sends a session description object to the WebRTC application server 40 (in this example, via an HTTPS connection). The WebRTC session description object in this example is a Session Description Protocol (SDP) object referred to as SDP Object A, as indicated by arrow 80. SDP Object A represents the "offer" in the WebRTC offer/answer exchange. SDP Object A specifies the media types and capabilities that the second WebRTC client 20 supports and prefers for use in the WebRTC interactive flow. As indicated by arrow 82, the scripting engine 28 of the first WebRTC client 16 receives the SDP Object A from the WebRTC application server 40 by a secure web connection. After the scripting engine 28 receives the SDP Object A from the WebRTC application server 40, the scripting engine 28 in response sends a WebRTC session description object, referred to as SDP Object B, to the IdP identifier management agent 12, as indicated by arrow 84. The SDP Object B in this example represents the "answer" in the WebRTC offer/answer exchange.

At this point, the IdP identifier management agent 12 begins the process of selecting one or more preferred IdP identifiers, obtaining identity assertions, and including the identity assertions in the SDP Object B. In this example, a preferred IdP identifier, represented by bidirectional arrow 86, may be requested and received by the IdP identifier management agent 12 from the enterprise policy server 58. It is to be understood that, in some embodiments, one or more preferred IdP identifiers may be stored as defaults by the first WebRTC client 16 and/or specified by a downloaded WebRTC web application. It is to be further understood that the preferred IdP identifier may have been received at an earlier point in time, such as at a startup of the first WebRTC client 16 and/or prior to or in conjunction with downloading the WebRTC web application from the WebRTC application server 40. As indicated by arrow 88, the IdP identifier management agent 12 then issues a request for an identity assertion to the IdP 50 corresponding to the preferred IdP identifier. The IdP identifier management agent 12 obtains the identity assertion, represented by arrow 90, from the IdP 50. In some embodiments, the scripting engine 28 may obtain the identity assertion, based on the preferred IdP identifier provided by or set by the IdP identifier management agent 12. The IdP identifier management agent 12 then modifies the SDP Object B to include the identity assertion.

With continuing reference to FIG. 3, the modified SDP Object B, referred to herein as SDP Object B', is then sent by the IdP identifier management agent 12 to the scripting engine 28, as indicated by arrow 91. The scripting engine 28 then sends the SDP Object B' to the WebRTC application server 40 via a secure network connection, as indicated by arrow 92. The WebRTC application server 40, in turn, forwards the SDP Object B' to the second WebRTC client 20, as shown by arrow 94. To confirm the identity assertion included in the SDP Object B', the second WebRTC client 20 issues a request for identity verification, represented by bidirectional arrow 96, to the IdP 50. The IdP 50 then provides an identity verification to the second WebRTC client 20, as indicated by arrow 98. In some embodiments, the second WebRTC client 20 may utilize an IdP other than the IdP 50 to obtain verification of the identity assertion included in the SDP Object B'.

With the identity of the first WebRTC client 16 confirmed, the WebRTC clients 16 and 20 proceed with establishing a WebRTC interactive flow. The WebRTC clients 16 and 20 (in particular, the WebRTC functionality provider 30) begin "hole punching" to determine the best way to establish direct communications between the WebRTC clients 16 and 20. The hole punching process is indicated by bidirectional arrow 100 in FIG. 3. Hole punching is a technique, often using protocols such as Interactive Connectivity Establishment (ICE), in which two web clients establish a connection with an unrestricted third-party server (not shown) that uncovers external and internal address information for use in direct communications. In some embodiments, further identity assertion may also be carried out in conjunction with hole punching (e.g., during an exchange of ICE candidates between the first WebRTC client 16 and the second WebRTC client 20). If the hole punching is successful, the second WebRTC client 20 and the WebRTC functionality provider 30 of the first WebRTC client 16 may establish a secure peer connection and begin exchanging a secure WebRTC interactive flow, as shown by bidirectional arrow 104.

Figure 4:
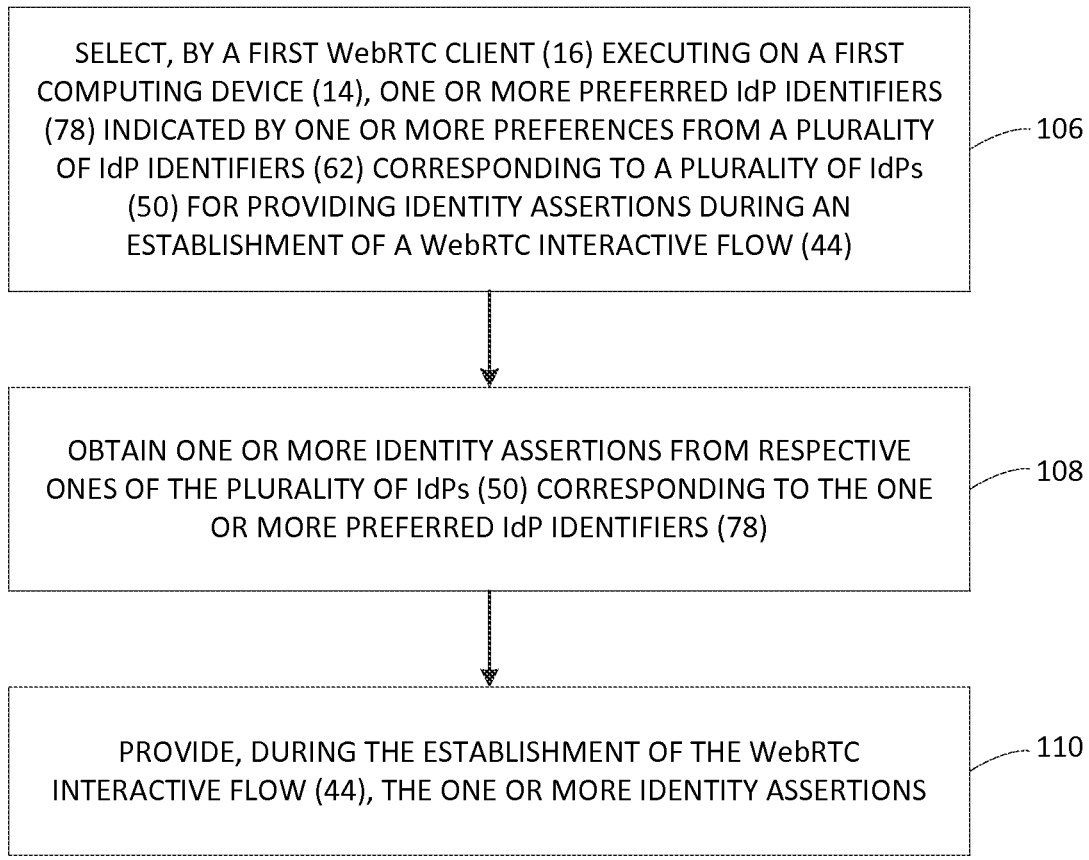
FIG. 4 is a flowchart illustrating exemplary operations for managing IdP identifiers for WebRTC interactive flows.

To illustrate exemplary operations for managing IdP identifiers for WebRTC interactive flows, FIG. 4 is provided. For the sake of clarity, elements of FIGS. 1-3 are referenced in describing FIG. 4. Operations begin with the IdP identifier management agent 12 of the first WebRTC client 16 executing on a first computing device 14 selecting one or more preferred IdP identifiers 78 indicated by one or more preferences from a plurality of IdP identifiers 62 (block 106). The plurality of IdP identifiers 62 correspond to a plurality of IdPs 50 for providing identity assertions during establishment of a WebRTC interactive flow 44. The plurality of IdP identifiers 62 may be provided by an enterprise policy specified by the enterprise policy server 58, may be stored by the first WebRTC client 16, and/or may be provided by a downloaded WebRTC web application. The one or more preferences may be provided by an enterprise policy specified by the enterprise policy server 58, and/or may be based on a preference indicated by a user input.

The IdP identifier management agent 12 next obtains one or more identity assertions from respective ones of the plurality of IdPs 50 corresponding to the one or more preferred IdP identifiers 78 (block 108). In some embodiments, obtaining the one or more identity assertions may include modifying one or more WebRTC API calls within a downloaded WebRTC web application. As a non-limiting example, the IdP identifier management agent 12 may modify an instruction such as a setIdentityProvider instruction in the WebRTC web application to include the one or more preferred IdP identifiers 78, or may insert additional setIdentityProvider instructions.

The IdP identifier management agent 12 then provides, during establishment of the WebRTC interactive flow 44, the one or more identity assertions (block 110). Some embodiments may provide that the one or more identity assertions are included as part of the initiation dialogue 42 (e.g., as part of a WebRTC offer/answer exchange). In some embodiments, providing the one or more identity assertions may include modifying one or more WebRTC API calls within a downloaded WebRTC web application. For instance, the IdP identifier management agent 12 may modify an instruction such as a createOffer and/or a createAnswer instruction, as non-limiting examples. By modifying the instruction, the IdP identifier management agent 12 may include the one or more identity assertions as part of the WebRTC offer/answer.

Figure 5:
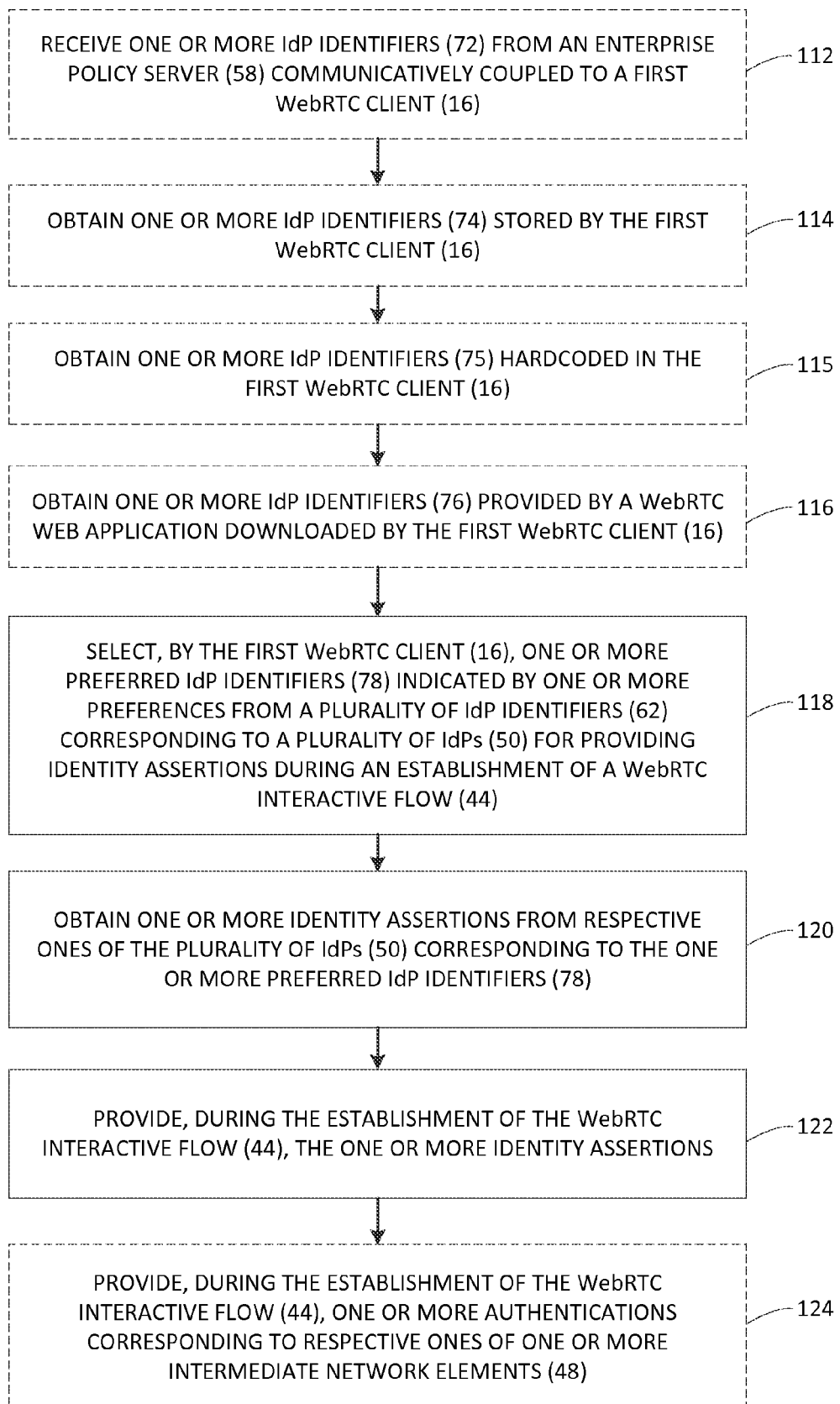
FIG. 5 is a flowchart illustrating more detailed exemplary operations for managing IdP identifiers for WebRTC interactive flows.

FIG. 5 illustrates more detailed exemplary operations for managing IdP identifiers for WebRTC interactive flows. In describing FIG. 5, elements of FIGS. 1-3 are referenced for the sake of clarity. Operations begin with the IdP identifier management agent 12 optionally receiving one or more IdP identifiers 72 from an enterprise policy server 58 communicatively coupled to a first WebRTC client 16 (block 112). In some embodiments, the one or more IdP identifiers 72 may be provided by an enterprise policy specified by the enterprise policy server 58. The IdP identifier management agent 12 may also optionally obtain one or more IdP identifiers 74 stored by the first WebRTC client 16 (block 114). The one or more IdP identifiers 74 may include default IdP identifiers stored by the first WebRTC client 16, as non-limiting examples. The IdP management agent 12 may also obtain one or more IdP identifiers 75 hardcoded in the first WebRTC client 16 (block 115). The IdP identifier management agent 12 may also optionally obtain one or more IdP identifiers 76 provided by a WebRTC web application downloaded by the first WebRTC client 16 (block 116). In some embodiments, the one or more IdP identifiers 76 may be specified by instructions contained within the WebRTC web application.

The IdP identifier management agent 12 next selects one or more preferred IdP identifiers 78 indicated by one or more preferences from a plurality of IdP identifiers 62 corresponding to a plurality of IdPs 50 for providing identity assertions during an establishment of a WebRTC interactive flow 44 (block 118). As noted above, the plurality of IdP identifiers 62 may be provided by an enterprise policy specified by the enterprise policy server 58, may be stored by the first WebRTC client 16, and/or may be provided by a downloaded WebRTC web application. The one or more preferences may be provided by an enterprise policy specified by the enterprise policy server 58, and/or may be based on a preference indicated by a user input.

The IdP identifier management agent 12 then obtains one or more identity assertions from respective ones of the plurality of IdPs 50 corresponding to the one or more preferred IdP identifiers 78 (block 120). In some embodiments, obtaining the one or more identity assertions may include modifying one or more WebRTC API calls within a downloaded WebRTC web application. As a non-limiting example, the IdP identifier management agent 12 may modify an instruction such as a setIdentityProvider instruction in the WebRTC web application to include the one or more preferred IdP identifiers 78, or may insert additional setIdentityProvider instructions.

The IdP identifier management agent 12 provides, during establishment of the WebRTC interactive flow 44, the one or more identity assertions (block 122). Some embodiments may provide that the one or more identity assertions are included as part of the initiation dialogue 42 (e.g., as part of a WebRTC offer/answer exchange). In some embodiments, providing the one or more identity assertions may include modifying one or more WebRTC API calls within a downloaded WebRTC web application. For instance, the IdP identifier management agent 12 may modify an instruction such as a createOffer and/or a createAnswer instruction, as non-limiting examples. By modifying the instruction, the IdP identifier management agent 12 may include the one or more identity assertions as part of the WebRTC offer/answer.

In some embodiments, the IdP identifier management agent 12 may provide, during the establishment of the WebRTC interactive flow 44, one or more authentications corresponding to respective ones of one or more intermediate network elements 48 (block 124). This may enable the first WebRTC client 16 to automatically provide credentials for accessing the functionality of the network element 48. As non-limiting examples, the IdP identifier management agent 12 may provide a STUN server authentication and/or a TURN server authentication for the first WebRTC client 16.

Figure 6:
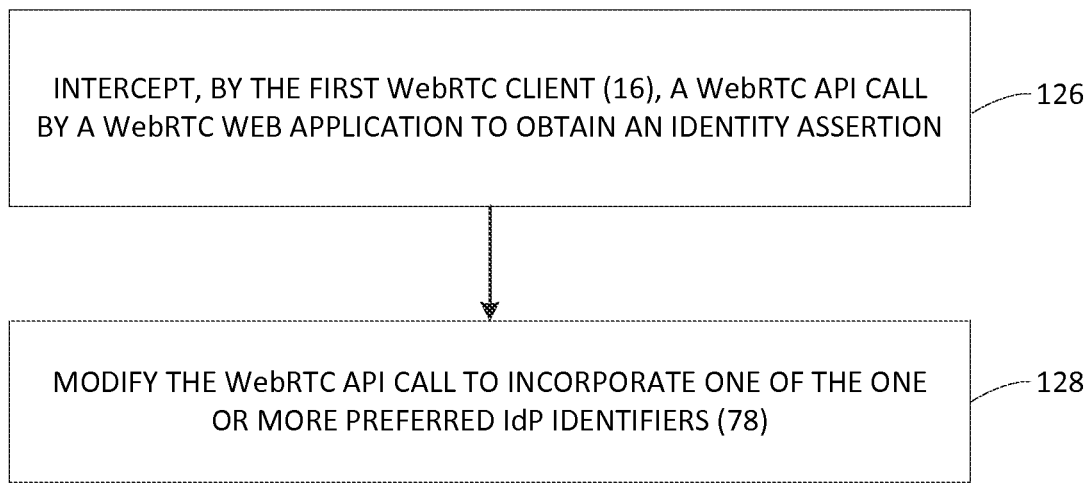
FIG. 6 is a flowchart illustrating more detailed exemplary operations for obtaining one or more identity assertions by the IdP identifier management agent of FIG. 1.

As described above, the IdP identifier management agent 12 obtains one or more identity assertions based on the one or more preferred IdP identifiers 78. In this regard, FIG. 6 illustrates more detailed exemplary operations for the IdP identifier management agent 12 to obtain the one or more identity assertions. In the example of FIG. 6, operations begin with the IdP identifier management agent 12 of the first WebRTC client 16 intercepting a WebRTC API call by a WebRTC web application to obtain an identity assertion (block 126). In some embodiments, the WebRTC API call may be a setIdentityProvider instruction within the WebRTC web application. The IdP identifier management agent 12 then modifies the WebRTC API call to incorporate one of the one or more preferred IdP identifiers 78 (block 128). In this manner, the IdP identifier management agent 12 may automatically ensure that the one or more preferred IdP identifiers 78 are used for identity authentication during the initiation dialogue 42.

Figure 7:
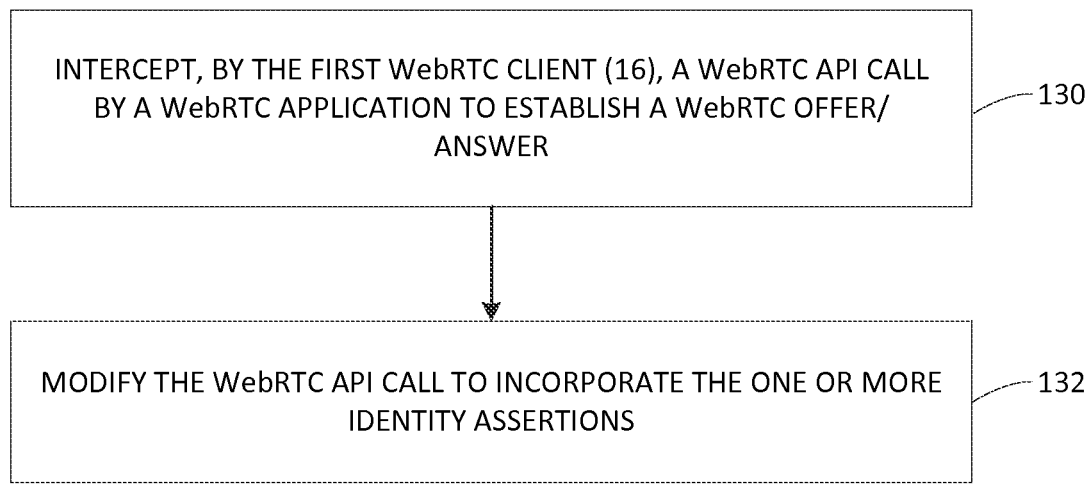
FIG. 7 a flowchart illustrating more detailed exemplary operations for providing one or more identity assertions by the IdP identifier management agent of FIG. 1.

To illustrate more detailed exemplary operations for the IdP identifier management agent 12 of FIG. 1 to provide one or more identity assertions during establishment of the WebRTC interactive flow 44, FIG. 7 is provided. In the example of FIG. 7, operations begin with the IdP identifier management agent 12 of the first WebRTC client 16 intercepting a WebRTC API call by a WebRTC web application to establish a WebRTC offer/answer (block 130). Some embodiments may provide that the WebRTC API call intercepted by the IdP identifier management agent 12 is a createOffer or createAnswer instruction. The IdP identifier management agent 12 then modifies the WebRTC API call to incorporate the one or more identity assertions (block 132).

Figure 8:
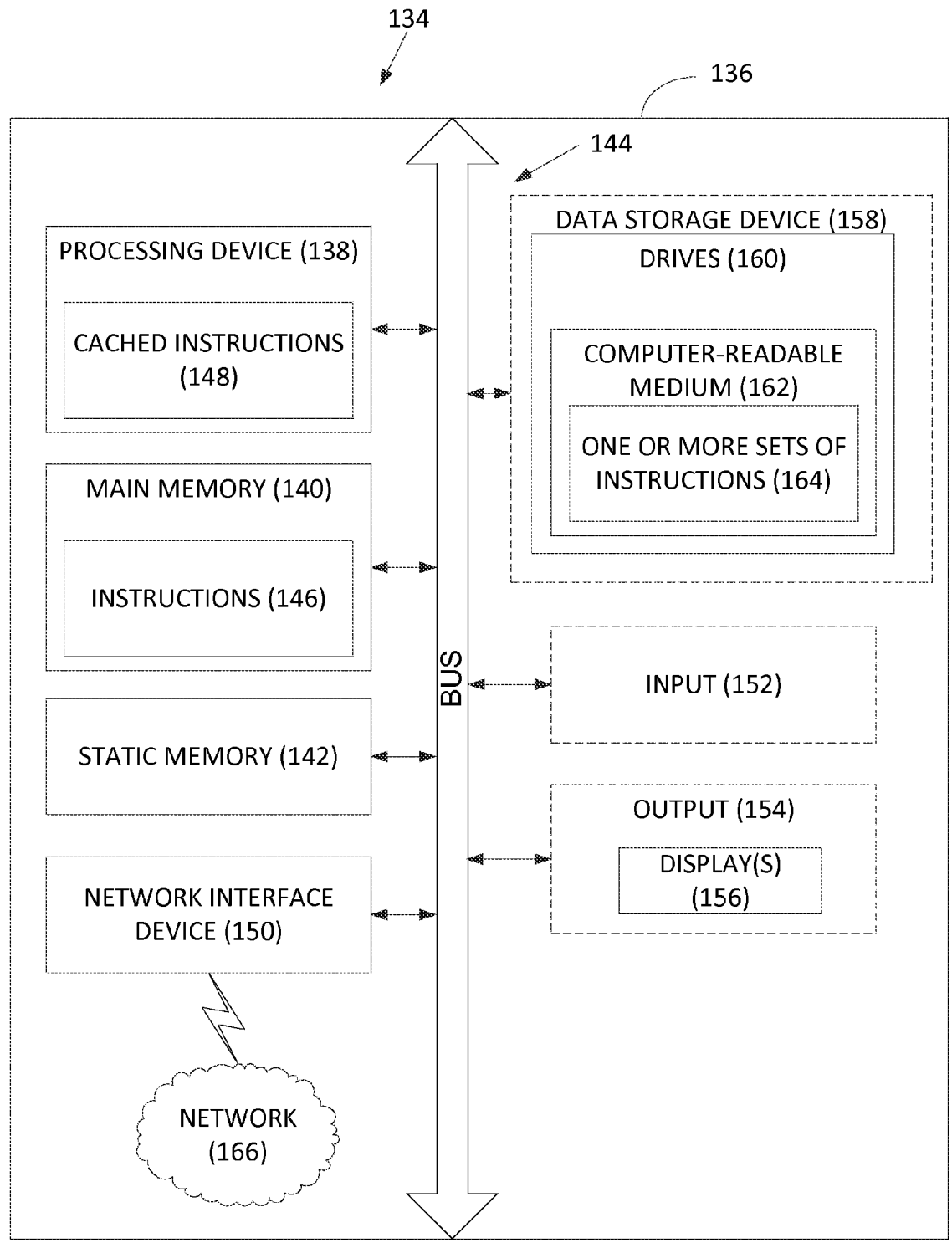
FIG. 8 is a block diagram of an exemplary processor-based system that may include the IdP identifier management agent of FIG. 1.

FIG. 8 provides a block diagram representation of a processing system 134 in the exemplary form of an exemplary computer system 136 adapted to execute instructions to perform the functions described herein. In some embodiments, the processing system 134 may execute instructions to perform the functions of the IdP identifier management agent 12 of FIG. 1. In this regard, the processing system 134 may comprise the computer system 136, within which a set of instructions for causing the processing system 134 to perform any one or more of the methodologies discussed herein may be executed. The processing system 134 may be connected (as a non-limiting example, networked) to other machines in a local area network (LAN), an intranet, an extranet, or the Internet. The processing system 134 may operate in a client-server network environment, or as a peer machine in a peer-to-peer (or distributed) network environment. While only a single processing system 134 is illustrated, the terms "controller" and "server" shall also be taken to include any collection of machines that individually or jointly execute a set (or multiple sets) of instructions to perform any one or more of the methodologies discussed herein. The processing system 134 may be a server, a personal computer, a desktop computer, a laptop computer, a personal digital assistant (PDA), a computing pad, a mobile device, or any other device and may represent, as non-limiting examples, a server or a user's computer.

The exemplary computer system 136 includes a processing device or processor 138, a main memory 140 (as non-limiting examples, read-only memory (ROM), flash memory, dynamic random access memory (DRAM) such as synchronous DRAM (SDRAM), etc.), and a static memory 142 (as non-limiting examples, flash memory, static random access memory (SRAM), etc.), which may communicate with each other via a bus 144. Alternatively, the processing device 138 may be connected to the main memory 140 and/or the static memory 142 directly or via some other connectivity means.

The processing device 138 represents one or more processing devices such as a microprocessor, central processing unit (CPU), or the like. More particularly, the processing device 138 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 138 is configured to execute processing logic in instructions 146 and/or cached instructions 148 for performing the operations and steps discussed herein.

The computer system 136 may further include a communications interface in the form of a network interface device 150. It also may or may not include an input 152 to receive input and selections to be communicated to the computer system 136 when executing the instructions 146, 148. It also may or may not include an output 154, including but not limited to display(s) 156. The display(s) 156 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 136 may or may not include a data storage device 158 that includes using drive(s) 160 to store the functions described herein in a computer-readable medium 162, on which is stored one or more sets of instructions 164 (e.g., software) embodying any one or more of the methodologies or functions described herein. The functions can include the methods and/or other functions of the processing system 134, a participant user device, and/or a licensing server, as non-limiting examples. The one or more sets of instructions 164 may also reside, completely or at least partially, within the main memory 140 and/or within the processing device 138 during execution thereof by the computer system 136. The main memory 140 and the processing device 138 also constitute machine-accessible storage media. The instructions 146, 148, and/or 164 may further be transmitted or received over a network 166 via the network interface device 150. The network 166 may be an intra-network or an inter-network.

While the computer-readable medium 162 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 164. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for managing Identity Provider (IdP) identifiers for Web Real-Time Communications (WebRTC) interactive flows, comprising:
    selecting, by a WebRTC client executing on a computing device, a preferred IdP identifier, based on one or more preferences, from a plurality of different IdP identifiers corresponding to a plurality of different IdPs, each different IdP configured to provide a different identity assertion to the WebRTC client upon request during an establishment of a WebRTC interactive flow;
    obtaining a preferred identity assertion from an IdP corresponding to the preferred IdP identifier by:
        intercepting, by the WebRTC client, a WebRTC Application Programming Interface (API) call by a WebRTC web application to obtain an identity assertion; and
        modifying the WebRTC API call to incorporate the preferred IdP identifier; and
    providing, during the establishment of the WebRTC interactive flow, the preferred identity assertion.

2. The method of claim 1, wherein the plurality of different IdP identifiers comprises:
    one or more IdP identifiers received from an enterprise policy server communicatively coupled to the WebRTC client;
    one or more IdP identifiers stored by the WebRTC client;
    one or more IdP identifiers hardcoded into the WebRTC client; or
    one or more IdP identifiers provided by a WebRTC web application downloaded by the WebRTC client; or
    combinations thereof.

3. The method of claim 1, further comprising providing, during the establishment of the WebRTC interactive flow, one or more authentications corresponding to respective ones of one or more intermediate network elements.

4. The method of claim 3, wherein the one or more intermediate network elements comprise a Session Traversal Utilities for Network Address Translation (STUN) server or a Traversal Using Relays around Network Address Translation (TURN) server, or combinations thereof.

5. The method of claim 1, wherein one or more of the plurality of different IdP identifiers comprise an identity provider name, a protocol, or a username, or combinations thereof.

6. The method of claim 1, wherein the one or more preferences comprises a preference flag associated with one of the plurality of different IdP identifiers.

7. The method of claim 1, wherein the one or more preferences comprises an enterprise policy specified by an enterprise policy server.

8. The method of claim 1, wherein the one or more preferences comprises a preference indicated by a user input.

9. A method for managing Identity Provider (IdP) identifiers for Web Real-Time Communications (WebRTC) interactive flows, comprising:
  selecting, by a WebRTC client executing on a computing device, a preferred IdP identifier, based on one or more preferences, from a plurality of different IdP identifiers corresponding to a plurality of different IdPs, each different IdP configured to provide a different identity assertion to the WebRTC client upon request during an establishment of a WebRTC interactive flow;
    obtaining a preferred identity assertion from an IdP corresponding to the preferred IdP identifier; and
  providing, during the establishment of the WebRTC interactive flow, the preferred identity assertion by:
    intercepting, by the WebRTC client, a WebRTC Application Programming Interface (API) call by a WebRTC web application to establish a WebRTC offer/answer; and
    modifying the WebRTC API call to incorporate the preferred identity assertion.

10. A system for managing Identity Provider (IdP) identifiers for Web Real-Time Communications (WebRTC) interactive flows, comprising:
  at least one communications interface;
  a computing device associated with the at least one communications interface and comprising an IdP identifier management agent configured to:
    select a preferred IdP identifier, based on one or more preferences, from a plurality of different IdP identifiers corresponding to a plurality of different IdPs, each different IdP configured to provide a different identity assertion to the WebRTC client upon request during an establishment of a WebRTC interactive flow;
    obtain a preferred identity assertion from an IdP corresponding to the preferred IdP identifier via the at least one communications interface by:
      intercepting a WebRTC Application Programming Interface (API) call by a WebRTC web application to obtain an identity assertion; and
      modifying the WebRTC API call to incorporate the preferred IdP identifier; and
    provide, during the establishment of the WebRTC interactive flow, the preferred identity assertion.

11. The system of claim 10, wherein the IdP identifier management agent is configured to select the preferred IdP identifier from among:
  one or more IdP identifiers received from an enterprise policy server communicatively coupled to the computing device;
  one or more IdP identifiers stored by the computing device;
  one or more IdP identifiers hardcoded into the IdP identifier management agent; or
  one or more IdP identifiers provided by a WebRTC web application downloaded by the computing device; or combinations thereof.

12. The system of claim 10, wherein the IdP identifier management agent is further configured to provide, during the establishment of the WebRTC interactive flow, one or more authentications corresponding to respective ones of one or more intermediate network elements.

13. A system for managing Identity Provider (IdP) identifiers for Web Real-Time Communications (WebRTC) interactive flows, comprising:
  at least one communications interface;
  a computing device associated with the at least one communications interface and comprising an IdP identifier management agent configured to:
    select a preferred IdP identifier, based on one or more preferences, from a plurality of different IdP identifiers corresponding to a plurality of different IdPs, each different IdP configured to provide a different identity assertion to a WebRTC client executing on the computing device upon request during an establishment of a WebRTC interactive flow;
    obtain a preferred identity assertion from an IdP corresponding to the preferred IdP identifier via the at least one communications interface; and
    provide, during the establishment of the WebRTC interactive flow, the preferred identity assertion by:
      intercepting a WebRTC Application Programming Interface (API) call by a WebRTC web application to establish a WebRTC offer/answer; and
      modifying the WebRTC API call to incorporate the preferred identity assertion.

14. A non-transitory computer-readable medium having stored thereon computer-executable instructions to cause a processor to implement a method, comprising:
  selecting, by a Web Real-Time Communications (WebRTC) client, a preferred IdP identifier, based on one or more preferences, from a plurality of different IdP identifiers corresponding to a plurality of different IdPs, each different IdP configured to provide a different identity assertion to the WebRTC client upon request during an establishment of a WebRTC interactive flow;
  obtaining a preferred identity assertion from an IdP corresponding to the preferred IdP identifier by:
    intercepting, by the WebRTC client, a WebRTC Application Programming Interface (API) call by a WebRTC web application to obtain an identity assertion; and
    modifying the WebRTC API call to incorporate the preferred IdP identifier; and
  providing, during the establishment of the WebRTC interactive flow, the preferred identity assertion.

15. The non-transitory computer-readable medium of claim 14 having stored thereon the computer-executable instructions to cause the processor to implement the method, wherein the plurality of different IdP identifiers comprises:
  one or more IdP identifiers received from an enterprise policy server communicatively coupled to the WebRTC client;
  one or more IdP identifiers stored by the WebRTC client;

one or more IdP identifiers hardcoded into the WebRTC client; or one or more IdP identifiers provided by a WebRTC web application downloaded by the WebRTC client; or combinations thereof.

16. The non-transitory computer-readable medium of claim 14 having stored thereon the computer-executable instructions to cause the processor to implement the method, further comprising providing, during the establishment of the WebRTC interactive flow, one or more authentications corresponding to respective ones of one or more intermediate network elements.

17. A non-transitory computer-readable medium having stored thereon computer-executable instructions to cause a processor to implement a method, comprising:

selecting, by a Web Real-Time Communications (WebRTC) client, a preferred IdP identifier, based on one or more preferences, from a plurality of different IdP identifiers corresponding to a plurality of different IdPs, each different IdP configured to provide a different identity assertion to the WebRTC client upon request during an establishment of a WebRTC interactive flow;

obtaining a preferred identity assertion from an IdP corresponding to the preferred IdP identifier; and providing, during the establishment of the WebRTC interactive flow, the preferred identity assertion by:

intercepting, by the WebRTC client, a WebRTC Application Programming Interface (API) call by a WebRTC web application to establish a WebRTC offer/answer; and modifying the WebRTC API call to incorporate the preferred identity assertion.

* * * * *